Oct. 15, 1929.　　　F. A. CLARK　　　1,732,151
CONVERTIBLE SEAT FOR MOTOR VEHICLES
Filed Aug. 18, 1927　　　3 Sheets-Sheet 1
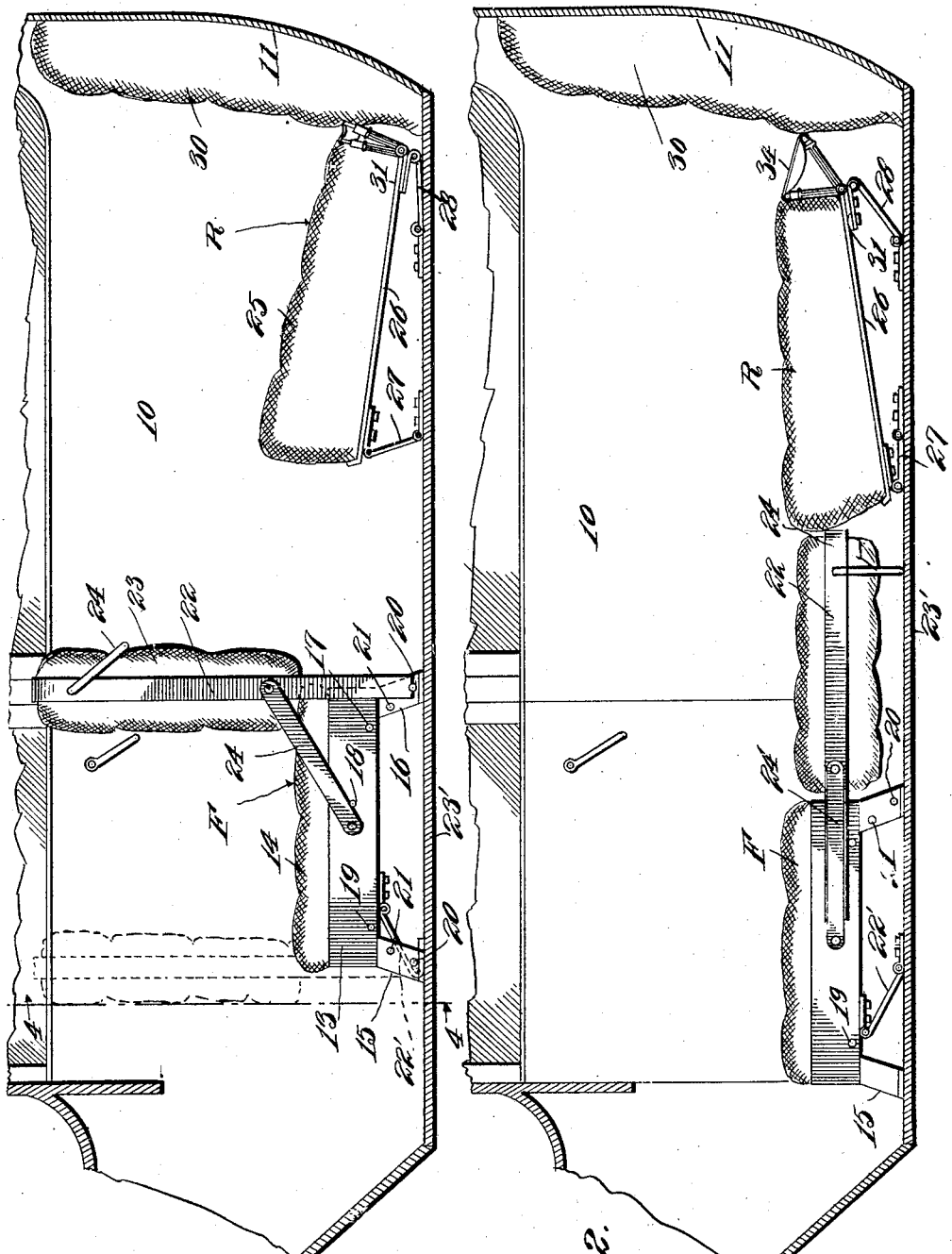
INVENTOR
Frank A. Clark.
BY
ATTORNEY Oct. 15, 1929.  F. A. CLARK  1,732,151
CONVERTIBLE SEAT FOR MOTOR VEHICLES
Filed Aug. 18, 1927  3 Sheets-Sheet 2
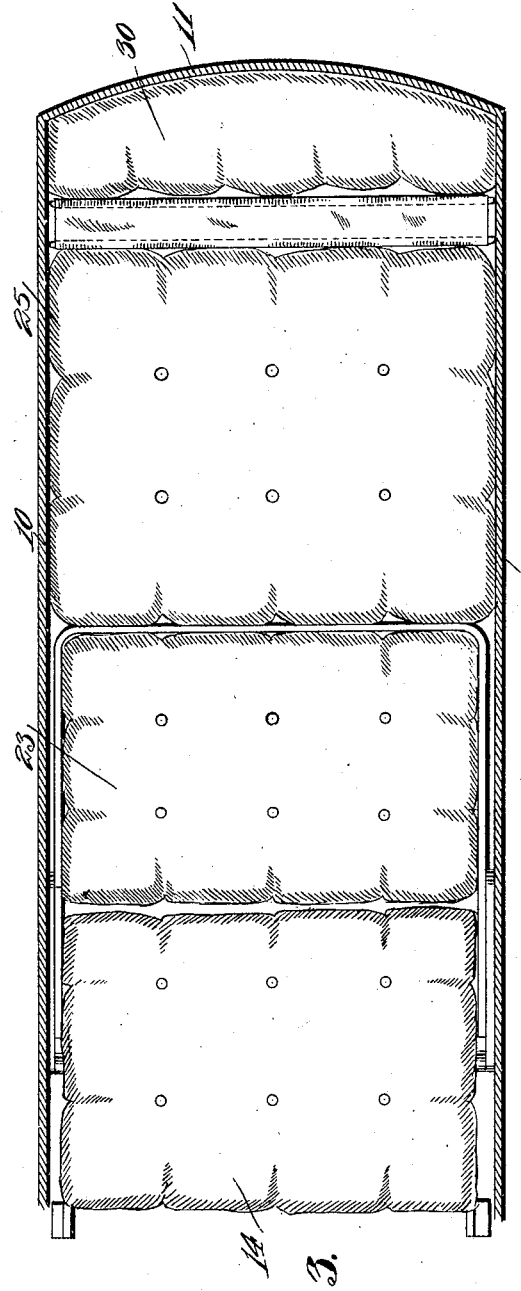
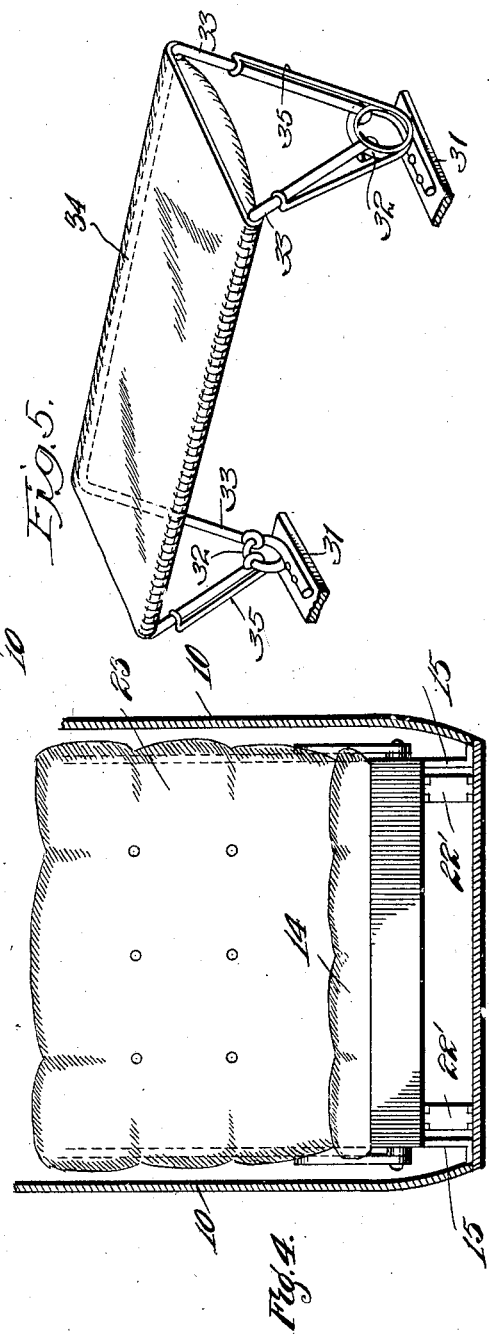
INVENTOR
Frank A. Clark.
BY Munn &Co.
ATTORNEY Oct. 15, 1929.  F. A. CLARK  1,732,151
CONVERTIBLE SEAT FOR MOTOR VEHICLES
Filed Aug. 18, 1927   3 Sheets-Sheet 3
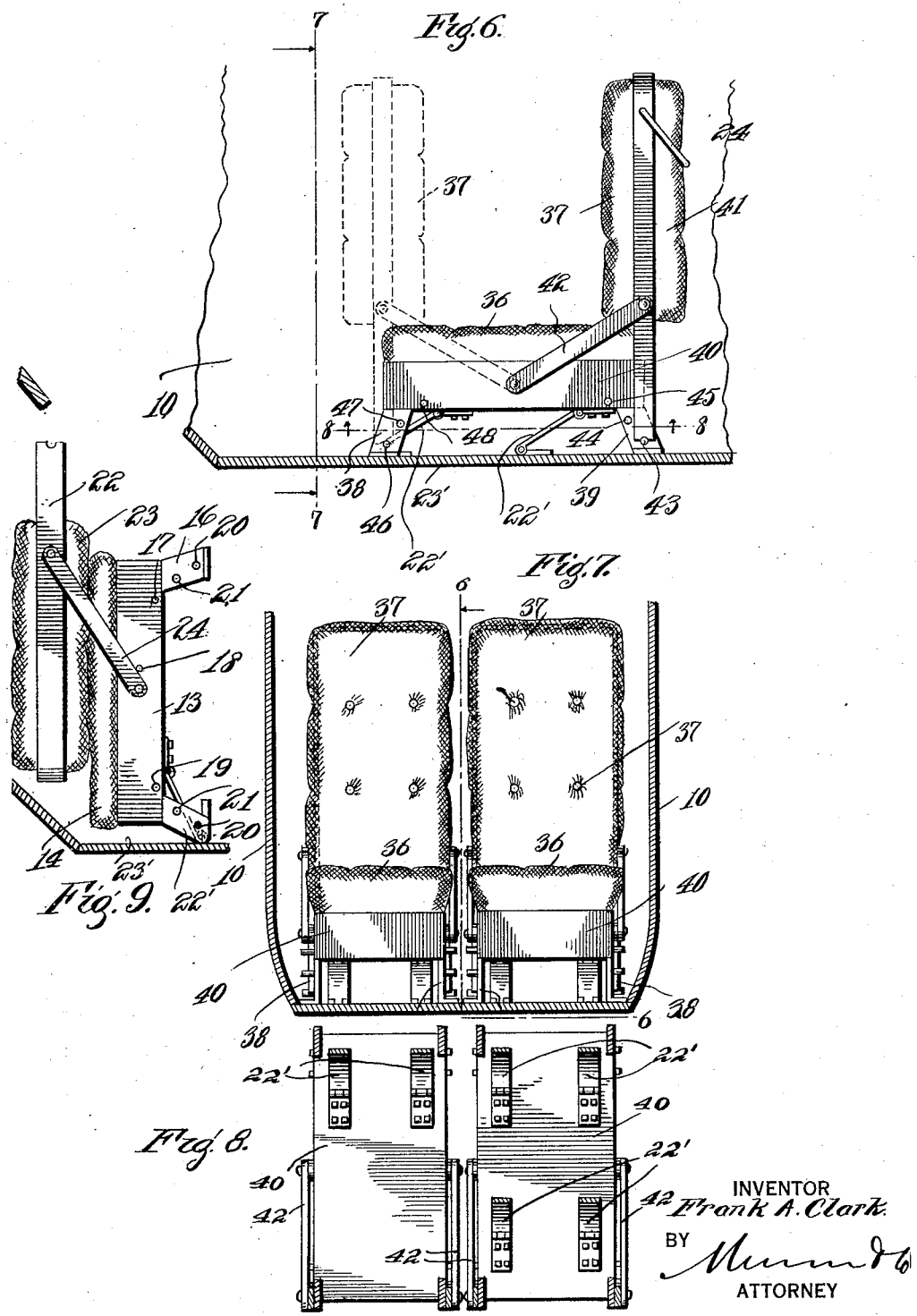
INVENTOR
Frank A. Clark.
BY
ATTORNEY Patented Oct. 15, 1929

1,732,151

UNITED STATES PATENT OFFICE

FRANK A. CLARK, OF SALEM, ILLINOIS

CONVERTIBLE SEAT FOR MOTOR VEHICLES

Application filed August 18, 1927. Serial No. 213,876.

This invention relates to a convertible seat for motor vehicles.

The object of the present invention is to provide seat structures, that may be used in motor vehicles or elsewhere readily convertible into a bed.

A further object of the invention is that forward or front seat may comprise two single seats or one seat extending substantially the width of the vehicle body; and in either case easily convertible into a bed or reversible so that the occupant may face the rear of the vehicle.

It is also an object of the invention that the seat structure be neat in appearance and durable.

It is a further object of the invention that the seat structures may be easily substituted for the conventional types of built-in seats of an automobile without detracting from the appearance thereof.

Other objects, and objects relating to details of construction, combination, and arrangement of parts will hereinafter appear in the detail description to follow.

The invention is illustrated by way of example in the accompanying drawings, in which:

Figure 1 is a fragmentary longitudinal sectional view taken through a motor vehicle body having my seat structures mounted therein, and employing one full seat at the forward end of the body, Figure 2 is a view similar to Figure 1 but showing the seats converted into a bed, Figure 3 is a horizontal sectional view of the motor vehicle body and showing the seats in plan when converted into bed, Figure 4 is a vertical sectional view taken substantially on the line 4—4 of Figure 1, Figure 5 is a detail view of the head rest or pillow-supporting means, Figure 6 is a vertical sectional view taken substantially on the line 6—6 of Figure 7 illustrating two single seats at the forward end of a vehicle body, Figure 7 is a fragmentary sectional view taken substantially on the line 7—7 of Figure 6, and Figure 8 is a horizontal sectional view on line 8—8 of Figure 6 and illustrating the manner of hinging the seats.

Figure 9 is a side elevation of one of the front seats in forwardly folded position.

Referring to the drawings more specifically and particularly to Figures 1 to 5 inclusive, 10 indicates the side walls of a motor vehicle body, and 11 the rear wall thereof. I have shown as mounted in the motor vehicle body a front seat F and a rear seat R constructed and mounted in accordance with the present invention and for the purposes set forth.

The front seat structure comprises a seat frame 13 with the usual spring cushion 14. A leg 15 supports each forward corner of seat frame 13 and a leg 16 supports each rear corner of said frame. The frame is provided upon each side with the studs 17, 18 and 19, and each leg is provided with two studs 20 and 21.

The back of the front seat structure comprises a U-shaped frame 22 within which is secured suitable upholstering 23. A bar or link 24 is pivoted to each side of the frame 13. As seen to advantage in Figures 1 and 2 each bar 24 has its one end pivoted to an intermediate point of the associated side of frame 13 and its other end pivotally connected to the associated leg portion of the frame 22. The lower end of each leg portion of the U-shaped frame 22 is provided with a notch adapted to seat upon either of the studs 17, 18, 20 and 21. The studs provide for angular adjustment and reversal of the back 23, as is apparent.

Beneath the forward end of the front seat there is arranged a pair of straps 22' each having its ends hingedly connected to the bottom of the seat and body floor 23' as shown. The straps 22 are disposed in the manner illustrated for a purpose that will appear. The back for the front seat F has pivoted to its frame a U-shaped robe rail 24. This robe rail should be strong and not easily bent for reasons to hereinafter appear.

The rear seat R comprises a conventional box seat generally designated by the reference numeral 25. The seat 25 is supported by a suitable frame 26. Each forward corner of seat frame 27 is connected to the floor 23' by a combined hinge and supports 28, and each rear corner of the seat frame similarly connected to the vehicle floor as at 28.

The back for the rear seat structure is built into the body of the motor vehicle in the usual manner, as generally indicated at 30.

In order to provide a head rest or pillow support, the rear seat frame 26 has secured thereto straps 31, one on each side thereof. Each strap terminates at its rear end in eye 32, and each eye 32 has hooked therein the corresponding ends of a pair of U-shaped frame members 33. The bridge portions of members 33 are connected by a strip of canvas 34 or other pliable material. V-shaped springs 35 are provided and arranged to spread the frame members 33 apart and maintain the canvas 34 taut. With the seat 25 in its normal position as shown in Figure 1, the frame members are folded within each other as shown in dotted lines in Figure 5, and also foldable between seat 25 and back 30.

Referring to Figures 6 and 7, there is shown two single seat structures in the forward end of a motor vehicle body, each seat comprising a suitable seat 36 and back 37. Each seat is supported by the front legs 38 and rear legs 39. Each seat 36 includes a frame 40 and each back includes a U-shaped frame 41. Each frame 41 is connected to its associated seat frame 40 by a pair of strap links 42. The free ends of members 41 may engage either of the lugs 43, 44 or 45 when in customary position, or may engage either of the lugs 46, 47 or 48 when in its reversed position as shown in dotted lines in Figure 6.

In the use of the structure shown in Figures 1 to 5 inclusive, if it is desired to convert the rear and front seats into a bed, the back of the front seat structure is placed in the position shown in Figure 2 and the seat of the back seat structure placed as shown in the same figure. The front seat may be swung forwardly to the dotted line position.

With the seats arranged as in Figure 3, the canvas 34 is stretched and will serve for a head rest. The rear seat 25 need only be swung forwardly to reverse its position as shown in Figure 1 when the same is used for a bed. If desired, the back to front seat F may be reversed as shown in Figure 6.

With the structure of single seats shown in Figures 6 and 7 either of the seat backs may be reversed, also either of the seats may be swung or shifted forwardly as shown in Figure 6. This last feature is of value to short legged operators of a motor vehicle. Also it may be mentioned that the reversibility of the backs enables the person not driving the motor vehicle to sit facing the rear which is an advantage.

The invention is applicable to two door or four door motor vehicles, and when employed with a two door motor vehicle, or when otherwise necessary, a single pair of hinges 22' is connected to the forward end to the right hand seat and to the floor 23'. This arrangement permits this right hand seat to be swung forwardly toward the floor board, as shown in Figure 9, to afford ample room for convenient passage into and out of the motor vehicle, or to provide additional space between the seats.

It is apparent that the convertible seat structures enable a bed to be made ready in a few moments, and that the bed provided will be comfortable and easy to reconstruct into seats when desired. Also it is pointed out that by bringing the ends of frame members 22 to engage with studs 17, 18, 20 and 21, different angular positions of the back 23 can be had, which is of advantage to the driver of the motor vehicle. While I have shown and described the preferred form of my invention, I wish it to be understood that I am aware that the general construction, combination and arrangement of the parts might be changed by those skilled in the art within the spirit of my invention, as indicated by the appended claims.

I claim:

1. In combination a back-rest, a tiltable seat support adjacent the back-rest with one end normally close to the latter, a collapsible headrest carried by the rear end of the seat and normally held in collapsed condition, and means for automatically opening the head rest to bridge the space between the back-rest and rear end of the seat upon reversely tilting the latter.

2. In a convertible seat and bed, a back-rest, a longitudinally shiftable seat normally disposed in a position where one end will be relatively close to the back-rest and adapted to be shifted away from the latter when the structure is to be used as a bed, hingedly connected inverted U-shaped members carried by the inner end of the seat, a flexible element attached thereto, and a spring engaging the inverted U-shaped members to urge them apart to cause the flexible element to bridge the space between the back-rest and seat when the latter is shifted away from the back-rest.

FRANK A. CLARK.